Figure 1:
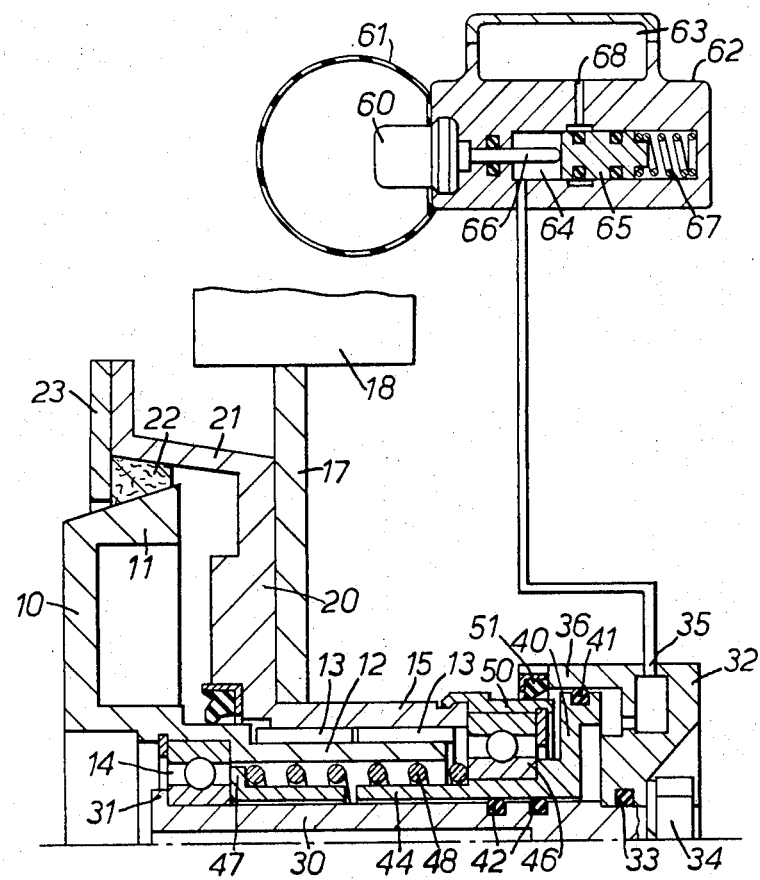

United States Patent [19]
Elmer

[11] 3,777,866
[45] Dec. 11, 1973

[54] FLUID PRESSURE RELEASED CLUTCH FOR FANS

[75] Inventor: Arthur Ernest Henry Elmer, Painswick, England

[73] Assignee: Dynair Limited, Gloucestershire, England

[22] Filed: Mar. 6, 1972

[21] Appl. No.: 232,089

[30] Foreign Application Priority Data
Mar. 11, 1971  Great Britain...................... 6,633/71

[52] U.S. Cl.............. 192/91 A, 192/82 T, 416/169
[51] Int. Cl............................................. F16d 25/08
[58] Field of Search..................... 192/85 CA, 91 A, 192/82 T

[56] References Cited
UNITED STATES PATENTS

| 2,806,567 | 9/1957 | Bonquet......................... 192/85 CA |
|---|---|---|
| 2,890,687 | 6/1959 | Richmond...................... 192/85 CA |
| 3,122,895 | 3/1964 | Woods............................... 192/85 X |
| 3,684,397 | 8/1972 | Elmer............................ 192/91 A X |
| 1,291,875 | 1/1919 | Herr................................. 192/91 X |
| 3,497,046 | 2/1970 | Schilling......................... 192/85 CA |
| 2,706,468 | 4/1955 | Willcox............................. 192/82 T |

Primary Examiner—Benjamin W. Wyche
Attorney—Irvin S. Thompson et al.

[57] ABSTRACT

A rotary cooling fan for a vehicle motor including a friction clutch engaged by relative axial movement between two clutch members, means for driving the input clutch member at one end of the fan hub, a fluid operated ram including a ram piston and ram cylinder mounted within the hub, means for admitting fluid to the ram from the other end of the hub, spring means acting directly between the ram piston and cylinder to engage the clutch, and two thrust bearings connected respectively between the two parts of the ram and the two clutch members.

6 Claims, 2 Drawing Figures

PATENTED DEC 11 1973

3,777,866

FLUID PRESSURE RELEASED CLUTCH FOR FANS

This invention relates to rotary fans and particularly though not exclusively to fans used for cooling purposes. The invention is especially applicable to cooling systems of internal combustion engines for road vehicles but may also be applied to cooling fans for other purposes or to air conditioning systems for example.

In many applications, and particularly in the case of internal combustion engines for vehicles, the cooling requirements are subject to wide variations dependent upon the operating conditions. For example when starting from cold little or no cooling is required until the engine has reached a predetermined temperature. Also during running the degree of cooling required varies greatly in accordance with the load and with external conditions such as air temperature and wind velocity and the relative speed of the vehicle. A cooling fan absorbs a considerable proportion of the total output power of the engine and considerable economies can be effected if the power absorption of the fan is reduced when cooling is not required or only required on a reduced level.

A number of prior proposals have been made to incorporate a clutch in the drive to a cooling fan, and to control the clutch by means of a thermal sensing device so that the drive to the fan will be engaged or disengaged in accordance with the sensed temperature, and it is one object of the invention to provide an improved rotary fan of this general type.

Broadly from one aspect the invention consists in a rotary fan hub assembly including a clutch actuated by relative axial movement between two clutch members, a fluid-operated ram mounted on or in the hub assembly and having two relatively movable parts each connected respectively through a thrust bearing with one of the two clutch members, means for connecting the clutch input member to an input drive member at one end of the hub assembly, and means at the other end of the hub assembly for admitting fluid under pressure to the ram.

From another aspect the invention consists in a rotary fan hub assembly including a rotary input drive member at one end, a clutch acting between the input member and an output member connected or connectable to a mounting for the fan blades, the output member being movable axially relative to the input member to engage and disengage the clutch, and a fluid-operated ram mounted in or on the hub assembly for effecting said relative axial movement of the output member, comprising a piston part and a cylinder part defining a ram chamber, a thrust bearing connecting one of said ram parts to the input member whereby said part is held fixed against relative axial movement, and a second thrust bearing connecting the other ram part to the output member whereby relative axial movement of said other ram part causes corresponding relative axial movement of the output member, and a fluid pressure conduit connected or connectable to said ram adjacent the other end of said assembly.

According to a preferred feature of the invention the fan hub assembly includes spring means acting directly between the two operative parts of the ram, and arranged to apply a spring force indirectly through the said thrust bearings to the two clutch members. Preferably the ram is single-acting and the spring opposes the operative movement of the ram, and acts in a direction to engage the clutch, so that little or no thrust is transmitted through the thrust bearings when the spring is loaded and the clutch is disengaged.

In any case both parts of the ram are preferably restrained against rotation, or at least capable of being stationary in a rotary sense while the other parts of the hub assembly rotate.

The fan hub assembly is preferably combined with a remotely positioned thermally responsive control means for admitting or relieving pressure fluid to the ram in response to changes in temperature at a thermal sensing element. Moreover according to a preferred feature of the invention the ram is designed for use with a hydraulic liquid, as opposed to a vacuum or pneumatic system. Thus according to another aspect the invention consists in a thermally controlled clutch actuated cooling fan, comprising a fan hub assembly including a clutch and an actuating ram, a remotely positioned thermal sensing element and a self-contained hydraulic circuit comprising an operating plunger associated with the thermal sensing element and a fluid pressure connection between said plunger and the actuating ram.

Figure 2:
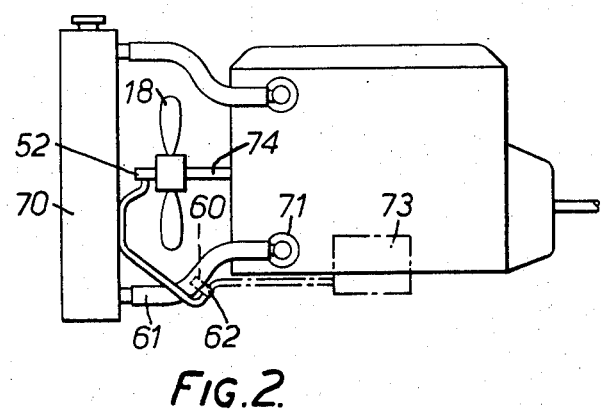

The invention may be performed in various ways and one specific embodiment will now be described by way of example with reference to the accompanying drawings, in which:

FIG. 1 is a half-sectional somewhat diagrammatic side elevation on an enlarged scale through a fan hub assembly according to the invention (showing only half the assembly above the centre line), with an associated self-contained hydraulic thermal control circuit, and FIG. 2 is a diagrammatic illustration of an internal combustion motor for a vehicle, including a liquid coolant radiator, and a cooling fan according to the invention.

In the example illustrated in FIG. 1 the hub assembly comprises a radial flange 10 provided with apertures (not shown) to receive mounting bolts by which it may be connected to the drive flange (not shown) of a fan driving shaft, or pulley, fitted on a water cooled internal combustion engine. At the outer periphery of this flange 10 is attached a ring 11 with a tapered conical external surface acting as the input member of a friction or viscous clutch (i.e., a clutch incorporating a viscous liquid to provide a slipping torsional drive). The flange 10 is also formed integral with a hollow tubular spigot 12 which acts as the internal bearing surface for a pair of needle roller bearings 13, and the spigot also locates the outer race of a ball-type thrust bearing 14 positioned within the spigot adjacent the input or driving end of the assembly. Mounted on and surrounding the roller bearings 13 is a cylindrical sleeve 15 acting as a hollow hub and also as a support for a ring 17 to which a number of cooling fan blades 18 are attached in any conventional manner. This sleeve 15 is formed integral with a radial flange 20 which has an annular part 21 surrounding the clutch input member 11 and arranged to locate a friction clutch ring 22 of trapezoidal cross-section, held in position by a locating plate 23. The inner surface of the friction ring 22 is conically tapered in the same sense as the external surface of the clutch input member 11 such that movement of the sleeve 15 with the parts 20 and 21 constituting the clutch output member will cause the friction ring 22 to engage with the clutch input member 11 so as to transmit torsional drive from the radial flange 10 to the fan blades 18. The whole assembly including the parts 15,20,21 and 17 is movable bodily on the roller bearings 13 in an axial direction with respect to the hollow spigot 12 to accommodate this axial movement, and the reaction force exerted by the cooling fan blades when rotating at speed acts in a direction to move the sleeve 15 forwards so that the clutch is held in engagement.

The hub assembly also includes an operating ram unit comprising a central non-rotary spindle 30 positioned on the centre line within the hollow spigot 12 and having an abutment or shoulder 31 at its inner end to locate the inner race of the thrust bearing 14. At the opposite outer end of this spindle 30 there is mounted an annular casing 32 constituting the cylinder of a hydraulic ram, this cylinder being provided with an O-ring seal 33 engaging the spindle 30 and being held in position on the outer end of the spindle by a lock nut 34. The casing 32 has a lateral fluid pressure connection 35 through which pressure fluid is admitted to the ram, as will be described below.

The ram also includes a relatively movable piston in the form of an annular piston flange 40 having an O-ring seal 41 at its outer edge to engage against the internal surface of the ram cylinder wall 36, while the radially inner surface of the flange seals against a pair of O-rings 42 mounted on the central spindle. This piston flange 40 is formed integral with a hollow tubular sleeve 44 which surrounds and is capable of sliding on the external surface of the spindle 30. This sleeve 44 is provided with an abutment or shoulder adjacent its outer end to locate the inner race of a second ball-type thrust bearing 46 and another sleeve 47 slidable on the spindle has a shoulder or abutment adjacent its inner end which acts as an abutment for one end of a helical compression spring 48, and also bears against the inner race of the thrust bearing 14. The other end of the spring bears against the inner race of the second thrust bearing 46. The outer race of this bearing 46 is rigidly located relative to the hub sleeve 15 by a locating ring 50 secured to the end of the sleeve and an annular dust proof seal 51 is provided between the lip of the ram cylinder wall 36 and the outer surface of this ring 50.

In the drawing the parts of the ram are shown in the positions occupied when the pressure is relieved from within the ram cylinder. In these conditions the spring 48 abuts at its inner end against the sleeve 47 bearing against the ball race 14 which is held fixed in an axial direction relative to the input flange 10, and the other end of the spring bears against the inner race of the other thrust bearing 46 and tends to urge this thrust bearing, combined with the movable ram flange 40, to the right. This carries the hub sleeve 15 and the parts 20,21 also to the right and so causes the friction clutch ring 22 to engage with the tapered clutch input ring 11, so that the fan blades 18 are driven. The reaction force on the blades when rotating also acts in the right hand direction augmenting the force tending to hold the clutch engaged.

When pressure fluid is admitted via the pressure coupling 35 into the ram chamber the ram cylinder is held fixed in an axial direction via the spindle 30 and the thrust bearing 14 and the ram piston ring 40 is thus urged to the left so carrying the thrust bearing 46 to the left and compressing the spring 48. The hub sleeve 15 and the clutch output members 20,21 are also moved leftwards so that the clutch ring 22 disengages from the clutch input member 11 and the drive to the fan blades 18 is interrupted. In these conditions although the spring 48 is compressed the spring force is not transmitted through the thrust bearings 14 and 46 since the spring acts directly against the inner races only of the two bearings, and hence on the two operative parts of the ram, and acts only indirectly through the thurst bearings on the two operative parts of the clutch. The spring loading need only be relatively light since once the friction clutch is engaged the reaction forces exerted by the fan blades will reinforce the engaging force. Thus when pressure fluid is admitted to the ram to disengage the clutch both ball thrust bearings are substntially completely unloaded: when on the other hand the pressure fluid is relieved and the clutch is engaged it is only the non-substantial force of the spring in its partly extended position which is transmitted through the ball races, and moreover in most practical applications the period or proportion of the total period during which the clutch is engaged will be only a small part of the total running time.

FIG. 1 also illustrates a self-contained hydraulic system for controlling the actuation of the clutch in response to the sensed temperature of a coolant for the engine. In this case it is assumed that the clutch is applied to a water cooled internal combustion engine as illustrated diagrammatically in FIG. 2. A temperature sensing element 60 in the form of a wax filled capsule is installed in the lower hose connection 61 between the bottom of the radiator 70 and the water inlet 71 to the cooling jacket of the engine. This is the return coolant duct which is from many points of view the optimum position for the temperature sensing element. The temperature here at 61 is the best indication of whether cooling by the fan is required or not, and automatically takes into account such factors as the ambient air temperature, the relative velocity of the vehicle and the load under which the engine is operating. The wax capsule 60 is directly coupled to a unit 62 which combines in the same casing a hydraulic oil reservoir 63 and a plunger valve chamber 64 containing a sliding piston 65 provided with O-ring seals and actuated by the movable stem 66 of the wax capsule, opposed by a spring 67. This piston 65 acts as a plunger pump and also controls a valve port 68 between the chamber 64 and the reservoir 63. The arrangement is such that if the temperature of the cooling water in the hose 61 falls below a predetermined level the wax substance in the capsule contracts and the stem 66 withdraws to the left. The piston 65 is thus urged in the same direction by the spring 67, closes the port 68 and forces hydraulic liquid from the chamber 64 via a flexible pressure conduit 69 into the coupling 35 communicating with the ram in the fan hub. This causes the ram piston 40 to move the left so as to disengage the clutch as explained above so that the fan is not driven. When the temperature of the coolant in the hose 61 rises the wax substance in the capsule 60 expands, the stem 66 moves towards the right and the piston 65 thus draws or allows hydraulic liquid to escape from the ram chamber in the fan hub via the conduit 68. When the valve piston 65 opens the port 68 the fluid can additionally pass into the oil reservoir 63. This system is thus entirely independent of any external liquid pressure supply but allows the clutch to be controlled from a remote position at the water cooling hose rather than at the fan hub itself. It will be understood that instead of such a self-contained system a thermally controlled valve associated with an independent liquid hydraulic pressure supply (such as hydraulic servo system, as indicated at 73 in FIG. 2), may be used.

It will be noted that the fan hub as described can readily be fitted to the end of a drive shaft as shown at 74 in FIG. 2, and requires no further supports or bearings so that it can simply be substituted for an existing fan hub. Moreover the whole ram unit of the fan hub is non-rotary and therefore there is no necessity for any rotary fluid seal in the fan hub itself.

It will be appreciated that instead of a hydraulically operated unit the fan hub and ram may be designed for operation by a pneumatic or vacuum system.

I claim:

1. A rotary fan hub assembly including a rotary input drive member at one axial end thereof and having means for securing said drive member to rotary drive means, a rotary output member supported by bearings on said input drive member for rotary and axial movement relative to said input drive member, said rotary output member having means for attachment of a plurality of fan blades, and said input drive member and said ouput member being rigidly connected respectively to clutch input and output members constituting a slipping clutch which is selectively engaged and disengaged by relative axial movement of said output member, a single-acting fluid-operated ram located at the other axial end of said assembly, remote from said input drive member, said ram including a non-rotating cylinder and non-rotating piston, two thrust bearings one connecting said cylinder to said input member and the other connecting said piston to said output member, a non-rotating fluid pressure conduit fixedly connected to said ram cylinder, whereby pressure fluid admitted to said ram cylinder causes relative axial movement between said cylinder and piston and consequent relative axial movement between said input and output members in a direction to disengage said clutch, and spring means connected between said ram cylinder and piston, said spring means acting through said one thrust bearing on said input member and through said other thrust bearing on said ouput member in an axial direction to engage said clutch.

2. A rotary fan hub assembly according to claim 1, having a plurality of fan blades secured to said rotary output member, the reaction forces created by the rotation of said blades having a component acting in an axial direction which moves said output member in a direction to cause engagement of said clutch.

3. A rotary fan hub assembly according to claim 1, wherein said output member is supported solely from said input member.

4. A rotary fan hub assembly according to claim 1, including axially movable abutment means connected respectively to said ram cylinder and to said ram piston, and wherein said abutment means are spaced apart in an axial direction when said clutch is engaged, and are in contact when said clutch is disengaged.

5. A fan hub assembly according to claim 1, in conjunction with a remotely positioned thermally responsive control means for selectively admitting or relieving pressure fluid to the ram in response to changes in temperature at a thermal sensing element.

6. A fan hub assembly according to claim 1, in which said ram is removable bodily from the end of the assembly remote from the input drive member, without dismantling the clutch.

* * * * *